Patented Jan. 11, 1944

2,339,083

UNITED STATES PATENT OFFICE 2,339,083

PRODUCTION OF SULPHATHIAZOLE

Leonard Christie Leitch and Leo Brickman, Montreal, Quebec, and Leo Edward Ryan, Dorval, Quebec, Canada, assignors to Mallinckrodt Chemical Works Limited, Montreal, Quebec, Canada No Drawing. Application April 11, 1942, Serial No. 438,586. In Canada July 5, 1941

11 Claims. (Cl. 260—302)

This invention relates to the production of sulphathiazole, and is particularly directed to a new and improved method of synthesizing the product whose properties make it useful in therapeutic applications.

The object of the invention is to provide a method whereby sulphathiazole may be made available in pure form and more economically than is possible by heretofore known methods.

In accordance with the invention sparingly soluble aminothiazole salts of certain sulphonic acids are coupled, in the presence of a tertiary amine, such as pyridine, quinoline, a dialkylaniline or pyridine bases in general, with a derivative of benzenesulphonyl halide having in the para position one of the following: $NO_2$, a halogen, an azo group, or —NHR where R represents an acyl group. The following are illustrative of the sulphonic acids from which the aminothiazole salts may be formed—m-nitrobenzenesulphonic acid, 2-chloro-p-cymene-3-(or -5) sulphonic acid, p-cymene-2-(or -3) sulphonic acid, o-chloro-p-toluenesulphonic acid and soluble salts of such acids.

In utilizing such salts rather than the free amine there is avoided the necessity of isolating the aminothiazole from the reaction mixture in which it is formed, as for example by the method disclosed in United States Patent 2,230,962. Moreover, further economy is obtained through the higher yield of sulphathiazole produced by the present method and the precipitants may be recovered readily from the mother liquors after the salt is coupled with the sulphonic acid.

The following examples illustrate how the invention may be carried out in practice but the invention is not to be limited by the specific details given therein.

(1) To a hot solution of 25 grams of sodium 2-chloro-p-cymene-3-(or -5) sulphonate dissolved in 200 cc. of water was added 50 cc. of aminothiazole hydrobromide liquor, as produced for example by the method of the above mentioned patent. After boiling for a few minutes with carbon black the solution was filtered, and the salt which crystallizes from the filtrate on cooling was collected, washed with cold water, and dried. The yield is 24–25 grams. The crude salt may be purified by recrystallization from water or alcohol. It then melts at 200–201° C.

To the crude salt mixed with 50 cc. of pyridine there was gradually added 12 grams of p-acetaminobenzene-sulphonyl chloride, and the mixture was heated at 95° C. for 2 hours. The solvent was removed in vacuo, and the acetylsulphathiazole isolated by adding 200 cc. of water and filtering off the solid. Yield 9.8 grams, melting point 248° C.

(2) To a hot solution of 25 grams of sodium cymene-3-sulphonate in 100 cc. of water was added 50 cc. of aminothiazole hydrobromide liquor. The amine salt separated immediately and was filtered off, and washed with cold water. Yield 18.3 grams, melting point 170–171° C.

17 grams of the crude salt in 25 cc. of pyridine was treated with 12 grams of p-acetaminobenzenesulphonyl chloride, and the mixture heated for 2 hours at 95° C. The acetylsulphathiazole was isolated as in the previous example. Yield 8.7 grams, melting point 249° C.

(3) To 17 grams of sodium m-nitrobenzenesulphonate dissolved in 50 cc. of water was added to 50 cc. of aminothiazole hydrobromide liquor. The precipitated salt was washed with 10 cc. of saturated sodium chloride solution and dried. Yield 18 grams, melting point 180° C.

To 18 grams of this salt mixed with 25 cc. of pyridine was added 13.5 grams of p-acetaminobenzenesulphonyl chloride and the mixture was heated for 2 hours at 95° C. The acetylsulphathiazole was isolated as before with a yield of 12.5 grams, melting point 246° C.

(4) To 25 grams of sodium o-chloro-p-toluenesulphonate dissolved in 100 cc. of water was added 100 cc. of aminothiazole hydrobromide liquor giving a yield of 21.2 grams of the amine salt having a melting point of 192° C.

12 grams of this amine salt in 20 cc. of pyridine and 9 grams of p-acetylaminobenzenesulphonyl chloride were heated for 2 hours at 95° C. to yield 9.3 grams of the sulphathiazole having a melting point of 251° C.

(5) 15 grams of aminothiazole o-chlorotoluene-p-sulfonate is mixed with 10 cc. of pyridine, 25 cc. of acetone, and 12 grams of p-acetaminobenzenesulfonyl chloride. The mixture is heated four hours, and then the acetone is distilled off. After removing the pyridine in vacuo the residue is treated with 100 cc. of distilled water, and the light brown precipitate of acetylsulphathiazole is filtered off and dried. Yield: 8.2 grams, melting point 248°.

(6) To 30 grams of aminothiazole o-chlor-p-toluene-sulphonate in 50 cc. of pyridine is added with shaking 21.1 grams of p-nitro-benzenesulphonyl chloride and the mixture is heated for about two hours at 90° C. The solvent is removed in vacuo and the residue treated with 200 cc. of water to isolate 24 grams of p-nitro-benzenesulphonamidothiazole, which is converted to sulphathiazole by reducing the nitro group to the amino.

(7) 30 grams of aminothiazole o-chlor-p-toluene-sulphonate and 21 grams of p-chlorbenzenesulphonyl chloride heated for two hours at about 95° C. in the presence of pyridine yields 24 grams p-chlorbenzenesulphonamidothiazole.

The coupling reaction may be illustrated as follows:

Aminothiazole salt of the sulphonic acid plus benzenesulphonyl halide derivative, in the presence of a tertiary amine solvent, yields the acetyl or other sulphathiazole. Structurally the coupling reaction may be illustrated thus

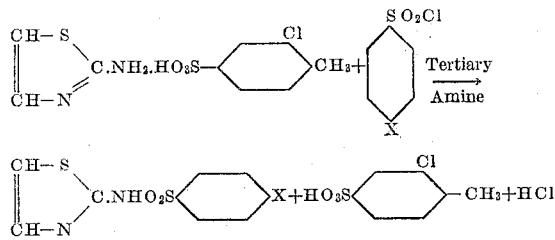

where X=NO₂, Cl, azo, or NHR where R is an acyl group.

The acetyl or other sulphathiazole product is converted to the sulphathiazole. The acetylsulphathiazole is hydrolyzed to sulphathiazole by any of the standard procedures using aqueous alkalies or mineral acids. Where the nitro or azo group replaces the acylamino group, sulphathiazole may be obtained by reduction with hydrogen. Where a halogen is present in the intermediate, it may be converted to sulphathiazole by treatment with aqueous or alcoholic ammonia under pressure and at elevated temperatures.

Instead of the liquor containing the aminothiazole in the form of bromide, or chloride, any other soluble salt, such as the acetate, nitrate or sulphate may be used. It will be observed that the direct precipitation with the aminothiazole salts of the sulphonic acids described yield the aminothiazole salt in a state of purity for direct coupling, and avoids tedious extraction and recrystallization with the losses incident thereto. In order to recover the precipitant after the coupling, the mother liquors thereof are rendered alkaline with a caustic alkali or carbonate and evaporated to a small volume, from which the salt crystallizes in nearly quantitative yield on cooling.

While particular details have been given in the examples it is to be understood that the invention is not limited thereto except as set forth in the appended claims. For example the reaction may be carried out at temperatures of 20 to 110° C.

We claim:

1. A method of preparing sulphathiazole which comprises causing aminothiazole salts of sulphonc acids to react, in the presence of a tertiary amine, with a derivative of benzenesulphonyl halide having in the para position one of the following—NO₂, a halogen, an azo group and NHR where R repressents an acyl group.

2. A method as defined in claim 1 wherein the mixture is heated at substantially 95° C. for about two hours.

3. In the production of sulphathiazole, the method which comprises forming an aminothiazole salt of one of a group consisting of m-nitrobenzenesulphonic acid, 2-chloro-p-cymene-3-(or -5) sulphonic acid, p-cymene-2-(or -3) sulphonic acid, o-chloro-p-toluenesulphonic acid and their soluble salts, and heating the resulting salt in the presence of a solvent having a pyridine base with a derivative of benzenesulphonyl halide having in the para position one of a group of substituents consisting of NO₂, a halogen, an azo group, and NHR where R represents an acyl group.

4. A method as set forth in claim 3 wherein said heating is continued for about 2 hours at about 95° C.

5. In the production of sulphathiazole, the method which comprises reacting, in the presence of a solvent having a pyridine base, p-acetoamidobenzenesulphonyl chloride with an aminothiazole salt of one of a group consisting of m-nitrobenzenesulphonic acid, 2-chloro-p-cymene-3-(or -5) sulphonic acid, p-cymene-2-(or -3) sulphonic acid, o-chloro-p-toluenesulphonic acid and their soluble salts and hydrolyzing the product.

6. A method as defined in claim 3 wherein the precipitating aminothiazole salt of said group is recovered for reuse.

7. A method as defined in claim 3 wherein the mother liquor is rendered alkaline and evaporated to small volume to recrystallize the precipitating salt.

8. The method of producing sulphathiazole which comprises reacting aminothiazole o-chlorp-toluenesulphonate with a derivative of benzenesulphonyl chloride having in the para position NHR where R represents an acyl group, in the presence of a tertiary amine, and hydrolyzing the acetylsulphathiazole formed to sulphathiazole.

9. A method as defined in claim 3 wherein the reaction product formed with the substituent in the para position consisting of one of a group consisting of NO₂ and an azo group is reduced to form sulphathiazole.

10. A method as defined in claim 3 wherein the reaction product formed with the substituent in the para position consisting of a halogen is treated with ammonia to form sulphathiazole.

11. A method as defined in claim 1 wherein the reaction product formed with the substituent in the para position including an acyl group is hydrolyzed to form sulphathiazole.

LEONARD CHRISTIE LEITCH.
LEO BRICKMAN.
LEO EDWARD RYAN.